(12) United States Patent
Bottome

(10) Patent No.: US 8,827,651 B2
(45) Date of Patent: Sep. 9, 2014

(54) ANNULUS FILLER

(75) Inventor: Kristofer J. Bottome, Nottingham (GB)

(73) Assignee: Rolls-Royce PLC, London (GB)

( * ) Notice: Subject to any disclaimer, the term of this patent is extended or adjusted under 35 U.S.C. 154(b) by 437 days.

(21) Appl. No.: 13/270,523

(22) Filed: Oct. 11, 2011

(65) Prior Publication Data

US 2012/0107102 A1 May 3, 2012

(30) Foreign Application Priority Data

Nov. 1, 2010 (GB) .................................. 1018339.0
Nov. 1, 2010 (GB) .................................. 1018366.3

(51) Int. Cl.
*F01D 5/22* (2006.01)
*F01D 11/00* (2006.01)
*F02C 7/05* (2006.01)

(52) U.S. Cl.
CPC ................. *F02C 7/05* (2013.01); *Y02T 50/672* (2013.01); *F01D 11/008* (2013.01)
USPC .................................................... 416/193 R

(58) Field of Classification Search
CPC ... F01D 11/006; F01D 11/008; F01D 21/045; F01D 5/3007; F01D 5/3015
USPC ............................... 416/193 R, 196 R, 193 A
See application file for complete search history.

(56) References Cited

U.S. PATENT DOCUMENTS

| | | | |
|---|---|---|---|
| 3,656,864 A * | 4/1972 | Wagle | 416/190 |
| 3,712,757 A * | 1/1973 | Goodwin | 416/245 R |
| 3,801,222 A | 4/1974 | Violette | |
| 3,905,722 A | 9/1975 | Guy et al. | |
| 4,019,832 A | 4/1977 | Salemme et al. | |
| 4,045,149 A | 8/1977 | Ravenhall | |
| 4,088,421 A * | 5/1978 | Hoeft | 416/193 A |
| 4,501,053 A | 2/1985 | Craig et al. | |
| 4,802,824 A | 2/1989 | Gastebois et al. | |
| 5,161,949 A | 11/1992 | Brioude et al. | |

(Continued)

FOREIGN PATENT DOCUMENTS

| | | |
|---|---|---|
| EP | 0 874 132 A2 | 10/1998 |
| EP | 1 865 154 A1 | 12/2007 |
| GB | 1 527 074 | 10/1978 |
| GB | 2 414 521 A | 11/2005 |

OTHER PUBLICATIONS

Lark, Snap Fit, Apr. 11, 2004, MIT.*

(Continued)

*Primary Examiner* — Liam McDowell
(74) *Attorney, Agent, or Firm* — Oliff PLC

(57) ABSTRACT

An annulus filler is provided for mounting to a rotor disc of a gas turbine engine and for bridging the gap between two adjacent blades attached to the rotor disc. The annulus filler has a body portion defining an airflow surface for air being drawn through the engine. The annulus filler further has a front attachment formation connecting a forward end of the body portion to the rotor disc and which allows rotational movement of the body portion thereabout. The annulus filler further has a rear attachment formation connecting a rearward end of the body portion to the rotor disc. The rear attachment formation comprises a spring element which extends between the body portion and the rotor disc. The spring element expands under operational centrifugal loading such that the rearward end of the body portion moves radially outwardly with the body portion rotating about the front attachment formation.

15 Claims, 4 Drawing Sheets

(56) References Cited

U.S. PATENT DOCUMENTS

| | | | |
|---|---|---|---|
| 5,466,125 A * | 11/1995 | Knott | 416/193 A |
| 5,520,514 A | 5/1996 | Mareix et al. | |
| 5,580,217 A * | 12/1996 | Richards et al. | 416/193 A |
| 2010/0209253 A1 * | 8/2010 | Menheere et al. | 416/219 R |

OTHER PUBLICATIONS

Great Britain Search Report dated Feb. 18, 2011 issued in Great Britain Patent Application No. GB 1018366.3.

* cited by examiner

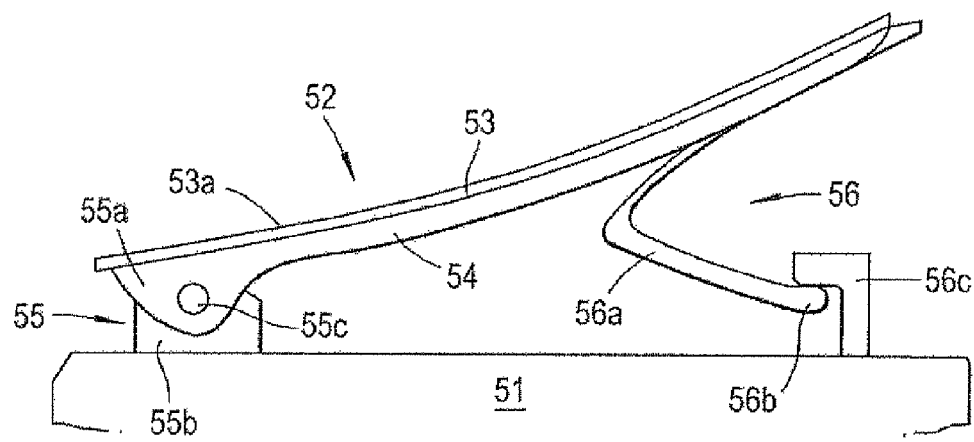
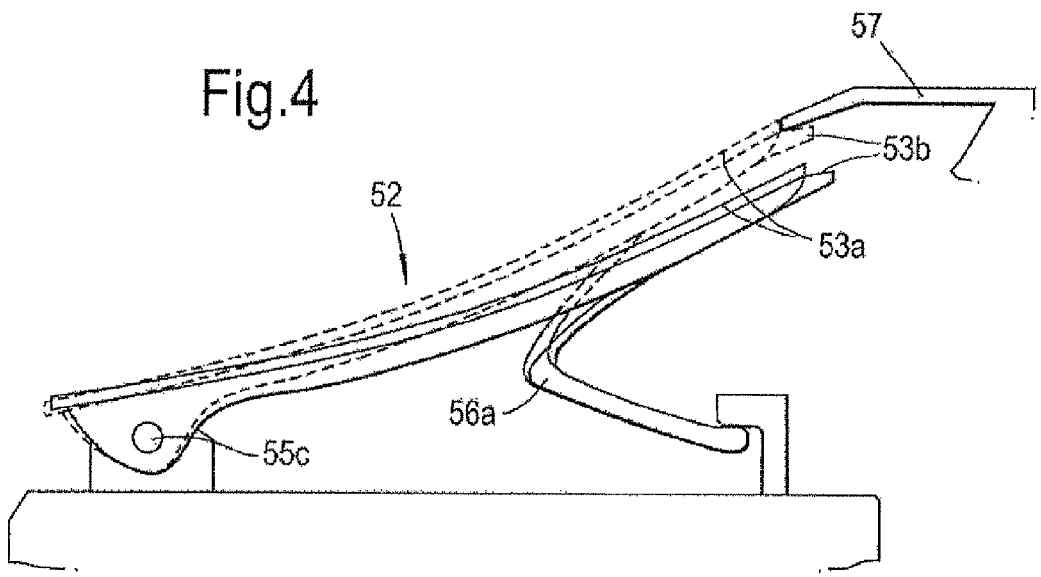

ANNULUS FILLER

The present invention relates to an annulus filler for mounting to a rotor disc of a gas turbine engine and for bridging the gap between two adjacent blades attached to the rotor disc.

BACKGROUND

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Each blade of the fan 12 is mounted on a rotor disc by inserting a root portion of the blade in a complementary retention groove in the outer face of the disc periphery. To ensure a smooth radially inner surface for air to flow over as it passes through the stage, annulus fillers can be used to bridge the spaces between adjacent blades. Typically, a seal between the annulus fillers and the adjacent fan blades is also provided by resilient strips bonded to the annulus fillers adjacent the fan blades. The fillers may be manufactured from relatively lightweight materials and, in the event of damage, may be replaced independently of the blades.

It is known to provide annulus fillers with features for removably attaching them to the rotor disc. An annulus filler may be provided with axially spaced hook members, the hook members sliding into engagement with respective parts of the rotor disc and/or a component located axially behind the rotor assembly, for example a rear fan air seal. FIG. 2 shows an example of such an annulus filler 32 viewed from the rear.

In use, the upper surface or lid 34 of the annulus filler 32 bridges the gap between two adjacent fan blades (not shown) and defines the inner wall of the flow annulus of a fan stage. The annulus filler 32 is mounted on a fan disc (not shown) by two hook members 36 and 38, respectively towards the forward and rearward ends of the annulus filler 32. It is also attached to a support ring (not shown) by a mounting feature 40. The two opposed side faces 42, 44 of the annulus filler are provided with respective seal strips 46, 48, and confront the aerofoil surfaces of the adjacent fan blades. Typically the annulus filler is a machined aluminium alloy forging.

In the event of a flan blade off (FBO) or foreign object impact (such as bird or ice impact), it is desirable for the annulus filler to absorb impact energy in such a way that the risk of loss or damage to the filler can be reduced.

BRIEF SUMMARY

Accordingly, a first aspect of the present invention provides an annulus filler for mounting to a rotor disc of a gas turbine engine and for bridging the gap between two adjacent blades attached to the rotor disc, the annulus filler having:

a body portion which defines an airflow surface for air being drawn through the engine, a front attachment formation which connects a forward end of the body portion to the rotor disc and which allows rotational movement of the body portion thereabout, and a rear attachment formation which connects a rearward end of the body portion to the rotor disc;

wherein the rear attachment formation comprises a spring element which extends between the body portion and the rotor disc, the spring element expanding under operational centrifugal loading such that the rearward end of the body portion moves radially outwardly with the body portion rotating about the front attachment formation.

If, in operation, an object impacts the airflow surface of the body portion, the energy of the impact can thus be absorbed by the spring element. In particular, the spring element can contract under the impact load to move the rearward end of the body portion radially inwardly with the body portion rotating about the front attachment formation. Although at least some of the absorbed impact energy will typically be released by a subsequent re-expansion of the spring element, the contraction of the spring element can help to decrease peak forces on the filler and thus reduce the risk of loss or damage to the filler. Further, hard body impact damage by the filler on a detached blade can also be decreased, which can reduce the effect of the impact on the blade trajectory.

The annulus filler may have any one or, to the extent that they are compatible, any combination of the following optional features.

The spring element can be configured to expand under operational centrifugal loading such that a rearwardmost edge of the body portion moves radially outwardly by a distance which is at least 0.1% (and preferably at least 0.3% or 1.0%) of the radius of the rotor disc as the engine progresses from a non-operational (i.e. non-rotating or "build") condition to an operational condition.

Preferably, the rear attachment formation joins to the rotor disc at a hook arrangement. This can facilitate installation of the filler to the engine. For example, the hook arrangement can be configured such that the filler is slid in a rearward direction of the engine to fit the filler in position between two adjacent blades.

Preferably, the front attachment formation comprises a pivot pin which restrains the body portion against translational movement at the pin, in operation the body portion rotating about the axis of the pin. Typically, the pivot pin is installed after the rear attachment formation is joined to the rotor disc. In other embodiments, however, the front attachment formation may comprise a hook member which hooks to a corresponding mount on the rotor disc, the hook member being able to pivot about the mount when hooked thereto such that the body portion can rotate about the mount. In other embodiments, however, the degree of pivoting allowed within the structure of the front attachment formation may be less or effectively zero. For example, the front attachment formation may make a substantially completely rigid connection to the rotor disc. Nonetheless, in these embodiments, the body portion can still rotate about the front attachment formation, e.g. by flexing of the body portion in the manner of a flexible cantilever beam which is rigidly fixed at the front attachment formation.

Conveniently, the spring element may be a V-shaped, C-shaped or O-shaped spring. The spring element can be formed of composite material or a metal. It can be integrally formed with the body portion of the filler.

The rear attachment formation may further comprise an expansion limiter which limits the maximum expansion achievable by the spring element. In this way, excessive radially outward movement of the rearward end of the body portion can be prevented. For example, a link on the spring element can limit the travel of the element.

Typically, the body portion comprises a lid portion that provides the airflow surface, and one or more ribs which extend along the underside of the lid portion to stiffen and strengthen the lid portion.

The annulus filler is typically self-loading in that, as a rotating component, the majority of forces on the filler are generated by its own mass. A lighter filler would therefore reduce its own internal forces as well as reducing forces on the rotor disc. More generally, reducing the mass of the engine contributes to improved airframe efficiency. Thus, preferably, the body portion comprises or is formed from a composite material. For example, the body portion may have a lid portion that is formed of composite material, and one or more stiffening ribs that are either formed of composite material or of metal.

Thus, the body portion can comprise a particle and/or fibre reinforced plastics material. Alternatively, the body portion can comprise a fibre reinforced plastic/metal laminate. Relative to a metal body portion, a composite material body portion is generally more flexible and frangible. Thus, particularly when used with composite blades, a composite material body portion can advantageously reduce the damage to a detached blade which would otherwise occur if the filler were to impact the blade in an FBO event.

Typically, the blades are fan blades. For example, they may be composite material fan blades.

A second aspect of the present invention provides a stage for a gas turbine engine having:
a rotor disc,
a plurality of circumferentially spaced apart blades attached to the rotor disc, and
a plurality of annulus fillers according to the first aspect bridging the gaps between adjacent blades.

BRIEF DESCRIPTION OF THE DRAWINGS

Embodiments of the invention will now be described by way of example with reference to the accompanying drawings in which:

FIG. 3 shows a schematic side view of a first embodiment of an annulus filler according to the present invention;

FIG. 4 shows further schematic side views of the first embodiment of the annulus filler, the filler position being shown in solid line when the engine is not in operation and in dashed line when the engine is in operation;

DETAILED DESCRIPTION OF EMBODIMENTS

Figure 1:
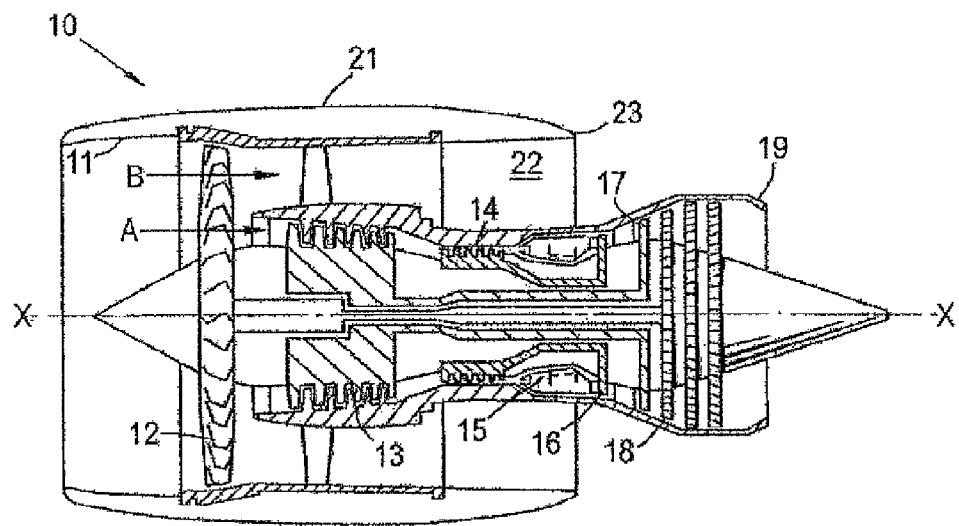
FIG. 1 shows a schematic longitudinal cross-section through a ducted fan gas turbine engine.

FIG. 3 shows a schematic side view of a first embodiment of an annulus filler for a fan rotor 51 according to the present invention. The filler has a body portion 52 comprising a lid portion 53 that defines an airflow surface 53a for air being drawn through the engine, and one or more strengthening/stiffening ribs 54 that extend from front to rear of the filler on the underside of the lid portion. The filler also has front 55 and rear 56 attachment formations at respectively the forward and rearward ends of the body portion for connecting the body portion to an outer surface of the fan rotor.

The front attachment formation 55 comprises a pair of side-by-side projections 55a from the underside of the body portion 52 (only the nearside projection being shown in FIG. 3). A facing projection 55b from the outer surface of the fan rotor 51 nests between the side-by-side projections, with a laterally extending metal pivot pin 55c penetrating through respective holes in the projections 55a, 55b. The body portion can rotate about the pivot pin, but is restrained against translational movement at its forward end by the pin.

The rear attachment formation 56 comprises a spring 56a which extends from the rear end of the body portion 52 to terminate in an engagement feature 56b which fits under a hook 56c extending from the outer surface of the fan rotor 51. The spring is V-shaped, such that in cross-section it has two spring arms which join at a central portion of the spring. Under tension the V-shape widens, and under compression it narrows.

FIG. 4 shows further schematic side views of the first embodiment of the annulus filler, the filler position being shown in solid line when the engine is not in operation and in dashed line when the engine is in operation. At build (i.e. when the engine is not in operation), the rest state of the spring 56a holds the body portion 52 such that the airflow surface 53a is inwards of its running (i.e. operational) position. This facilitates installation of the filler between opposing surfaces of adjacent blades, the installation typically being performed by sliding the filler into the gap between adjacent blades in the rearward direction of the engine until the engagement features fits under the hook 56c, the pin 55c then being inserted through the projections 55a, 55b. During running, the body portion undergoes centrifugal loading. This expands the spring, causing the body portion to rotate about the pivot pin 55c and allowing the lid portion 53 to run up to a fan rear seal 57 and appropriately position the airflow surface.

In order to prevent over-expansion of the spring 56a and a consequential incorrect running position of the lid portion 53, the rear attachment formation 56 may have an expansion limiter (not shown), e.g. in the form of a link extending between the arms of the V-shaped spring, which limits the maximum expansion achievable by the spring. Alternatively, however, at build, a rear lip 53b of the lid portion may fit under the front lip of the fan rear seal 57 (as shown in FIG. 4), whereby the front lip can serve as a stop on outwards movement of the rear lip of the lid portion, preventing over-expansion of the spring.

Under normal operation of the filler, the deflection at rear edge of the lid portion from build to running position can be in the range from 0.5 to 6 mm, depending upon application, i.e. speed of rotation and radial position of the filler. As a percentage of radial position, for a large civil engine this can equate to 0.1 to 1.25% deflection. For a smaller business jet engine, the percentage deflection can be higher, e.g. up to 4% with appropriate materials and engine conditions. The spring 56a is therefore configured depending on the particular application to provide the desired spring constant. For example, different thicknesses of material can be used in the spring, and/or the material of the spring can be changed.

Figure 5:
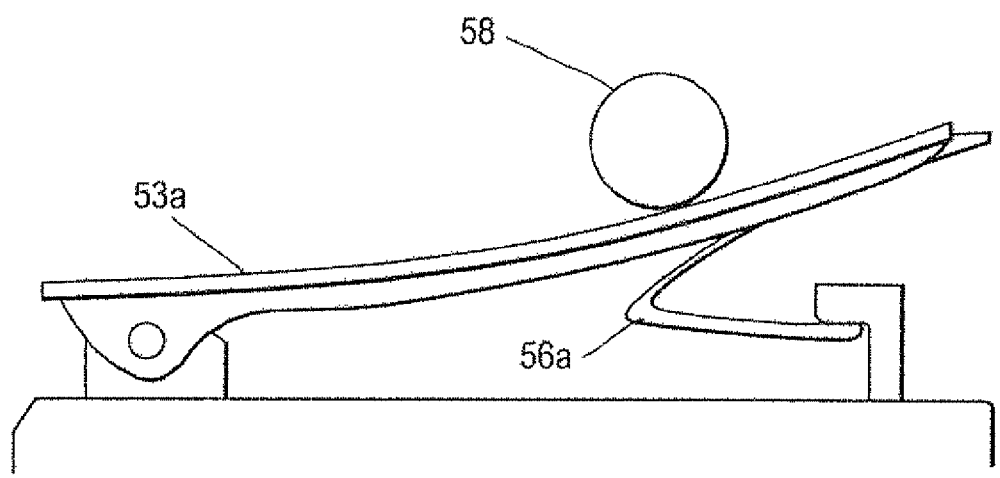
FIG. 5 shows schematically a side view of the first embodiment of the annulus filler undergoing impact by a foreign object on its airflow surface.

FIG. 5 shows schematically a side view of the first embodiment of the annulus filler undergoing impact by a foreign object 58 on the airflow surface 53a. Under such an impact, the filler rotates inwards, absorbing impact energy in the associated contraction of the spring 56a. This mechanism can help to reduce damage to the filler (which can be particularly advantageous when the filler is formed of plastics material, as discussed below). In particular, peak loads on the filler can be reduced, and the risk of the filler detaching can be decreased.

Excessive blade movement can occur under foreign body impact on a blade or during an FBO event. Under such circumstances, the inward rotation of the filler can likewise help to reduce damage to the filler or the risk of loss of the filler. Further, the filler can have a reduced effect on the trajectory of a released blade during an FBO event.

Advantageously, the body portion 52 comprises a composite material.

This can reduce the internal forces within the filler as well as reducing forces on the rotor disc. In addition, the overall mass of the engine can be decreased. Further, particularly in relation to FBO events involving composite blades, a lighter, more frangible, composite material filler can help to reduce damage to a detached blade.

Typically, the lid portion is formed of composite material. The ribs and attachment formations can then be formed of composite material or metal (e.g. aluminium alloy).

The composite material of the body portion can have a thermoset matrix, e.g. glass fibre or carbon fibre reinforcement in an epoxy, bismaleimide or polyester matrix, or can have thermoplastic matrix, e.g. poly-ether-ether-ketone (PEEK), PPS or polyamide with glass or carbon reinforcement. Thermoplastic matrices, in particular, are suitable for injection moulding. In general, the reinforcement can be continuous fibres, particulates or short fibres. The body portion can comprise a fibre reinforced plastic/metal laminate such as "GLAss-REinforced" fibre metal laminate. Another option is to use a relatively low-cost, long chopped fibre, bulk moulding compound. This could have a fibre length of 25 mm or greater in an epoxy matrix system. Example materials are HexMC™ from Hexcel, or MS-4A™ from YLA Composites. Such materials allow the body portion to be produced by a compression moulding system. Yet another option is to form the body portion from a hybrid carbon/glass epoxy pre-preg which can combine the benefits of the relatively high strain capability of glass fibres and the relatively high strength of the carbon fibres.

If the body portion is formed from box-type sections, (see FIG. 8 discussed below) then further manufacturing options can be considered. One option is to produce a fibre pre-form by winding or forming reinforcement material onto a male mandrel. This can utilise an automated computer numerically controlled method such as Automated Tape Lay-up, filament winding or braiding. The resulting dry pre-form can then be inserted into a mould and resin transfer moulded. Advantages of such automated methods are improving repeatability and reduced manufacturing costs. Another option is to 3D weave a dry pre-form for the body portion, which is then resin transfer moulded.

Figure 6A:
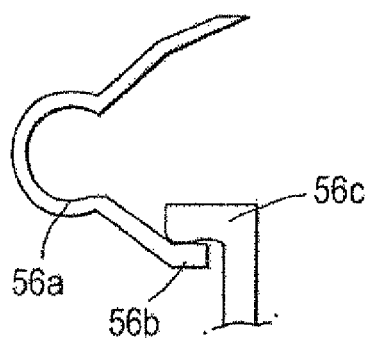
FIG. 6 shows schematically side views of (a) an O-shaped spring and (b) a C-shaped spring, which are alternative configurations for the spring of the first embodiment of the annulus filler.
Figure 6B:
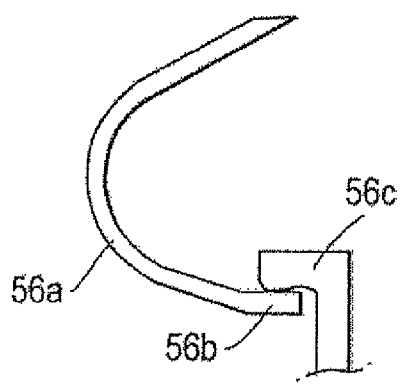

Various modifications can be made to the embodiment discussed above. For example, the spring 56a, instead of being V-shaped, can be Ω-shaped or C-shaped, as shown in FIGS. 6(a) and (b).

Figure 2:
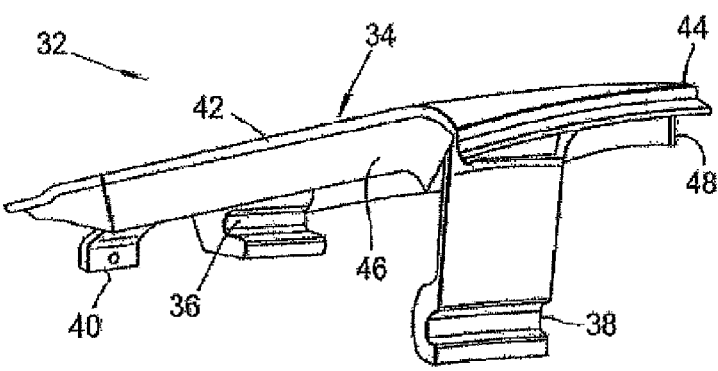
FIG. 2 shows an example of conventional annulus filler viewed from the rear.
Figure 7:
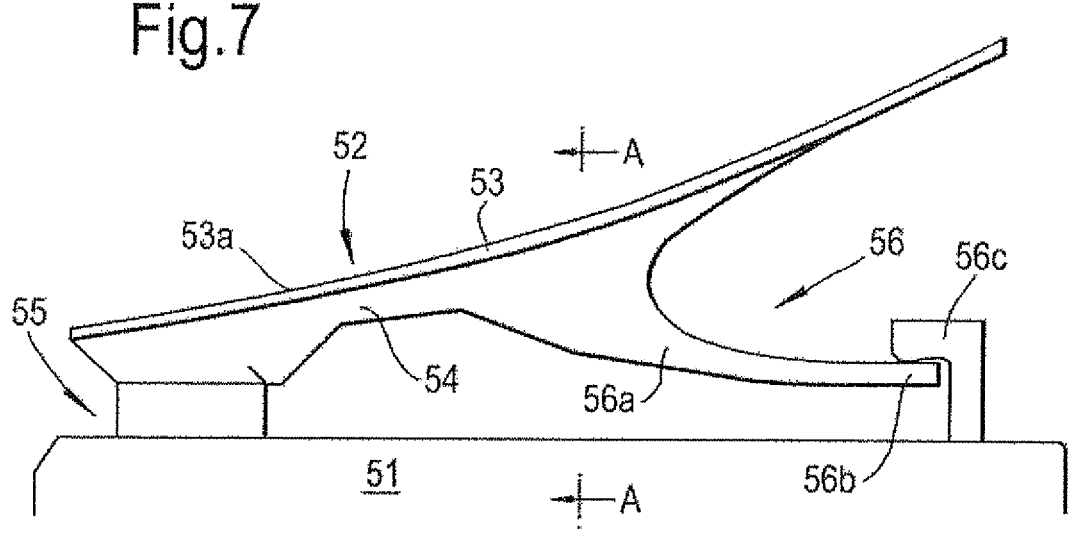
FIG. 7 shows a schematic side view of a second embodiment of an annulus filler according to the present invention.

The front 55 and rear 56 attachment formations can also be modified. For example, FIG. 7 shows a schematic side view of a second embodiment of an annulus filler according to the present invention. The front attachment formation in this embodiment is a rigid attachment to the rotor disc 51. Instead of pivoting about a pivot pin, the lid portion 53 and ribs 54 are sufficiently flexible to bend about the front attachment to cause inwards rotation of body portion 52. In a further variation, the front attachment formation could include a hook member, like the hook member 36 of annulus filler shown in FIG. 2. This would allow a degree of pivoting about the hook member, with any necessary further rotation of the body portion being provided by bending of the body portion.

Figure 8:
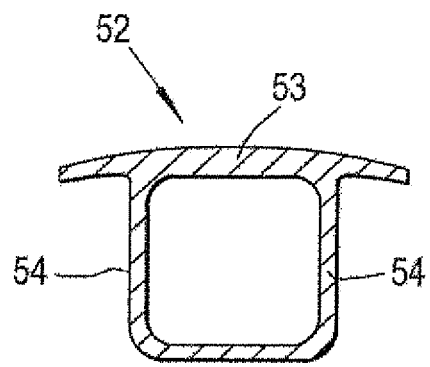
FIG. 8 shows a transverse cross-section through the second embodiment of the annulus filler along line A-A of FIG. 7.

In the second embodiment of the annulus filler, the spring 56a of the rear attachment formation 56 is shown formed integrally with the ribs 54. FIG. 8 shows a transverse cross-section through the second embodiment of the annulus filler along line A-A of FIG. 7 and also shows how the body portion 52 can have a box-type section formed by the lid portion 53 and ribs 54.

While the invention has been described in conjunction with the exemplary embodiments described above, many other equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An annulus filler for mounting to a rotor disc of a gas turbine engine and for bridging a gap between two adjacent blades attached to the rotor disc, wherein the annulus filler has:
   a body portion which defines an airflow surface for air being drawn through the engine,
   a front attachment formation which connects a forward end of the body portion to the rotor disc and which allows rotational movement of the body portion thereabout, and
   a rear attachment formation which connects a rearward end of the body portion to the rotor disc;
   wherein the rear attachment formation comprises a spring element which extends between the body portion and the rotor disc, the spring element expanding under operational centrifugal loading such that the rearward end of the body portion moves radially outwardly with the body portion rotating about the front attachment formation.

2. The annulus filler according to claim 1, wherein the spring element is configured to expand under operational centrifugal loading such that a rearwardmost edge of the body portion moves radially outwardly by a distance which is at least 0.1% of a radius of the rotor disc as the engine progresses from a non-operational condition to an operational condition.

3. The annulus filler according to claim 1, wherein the rear attachment formation joins to the rotor disc at a hook arrangement.

4. The annulus filler according to claim 1, wherein the spring element is a V-shaped, C-shaped or Ω-shaped spring.

5. The annulus filler according to claim 1, wherein the rear attachment formation further comprises an expansion limiter which limits the maximum expansion achievable by the spring element.

6. The annulus filler according to claim 1, wherein the body portion comprises a composite material.

7. The annulus filler according to claim 1, wherein the blades are fan blades.

8. A stage for a gas turbine engine having:
a rotor disc,
a plurality of circumferentially spaced apart blades attached to the rotor disc, and
a plurality of annulus fillers, each having:
   a body portion which defines an airflow surface for air being drawn through the engine,
   a front attachment formation which connects a forward end of the body portions to the rotor disc and which allows rotational movement of the body portions thereabout, and
   a rear attachment formation which connects a rearward end of the body portion to the rotor disc;
wherein the rear attachment formation comprises a spring element which extends between the body portion and the rotor disc, the spring element expanding under operational centrifugal loading such that the rearward end of the body portion moves radially outwardly with the body portion rotating about the front attachment formation.

9. An annulus filler for mounting to a rotor disc of a gas turbine engine and for bridging a gap between two adjacent blades attached to the rotor disc, wherein the annulus filler has:
   a body portion which defines an airflow surface for air being drawn through the engine,
   a front attachment formation which connects a forward end of the body portion to the rotor disc and which allows rotational movement of the body portion thereabout, and
   a rear attachment formation which connects a rearward end of the body portion to the rotor disc;
wherein the rear attachment formation comprises a spring element which extends between the body portion and the rotor disc, the spring element expanding under operational centrifugal loading such that the rearward end of the body portion moves radially outwardly with the body portion rotating about the front attachment formation, and
wherein the front attachment formation comprises a pivot pin which restrains the body portion against translational movement at the pin, in operation the body portion rotating about the axis of the pin.

10. The annulus filler according to claim 9, wherein the spring element is configured to expand under operational centrifugal loading such that a rearwardmost edge of the body portion moves radially outwardly by a distance which is at least 0.1% of a radius of the rotor disc as the engine progresses from a non-operational condition to an operational condition.

11. The annulus filler according to claim 9, wherein the rear attachment formation joins to the rotor disc at a hook arrangement.

12. The annulus filler according to claim 9, wherein the spring element is a V-shaped, C-shaped or Ω-shaped spring.

13. The annulus filler according to claim 9, wherein the rear attachment formation further comprises an expansion limiter which limits the maximum expansion achievable by the spring element.

14. The annulus filler according to claim 9, wherein the body portion comprises a composite material.

15. The annulus filler according to claim 9, wherein the blades are fan blades.

* * * * *